March 12, 1940.  J. T. RAMSDEN ET AL  2,193,779
LAWN PERFORATOR
Filed Dec. 7, 1937  7 Sheets-Sheet 1
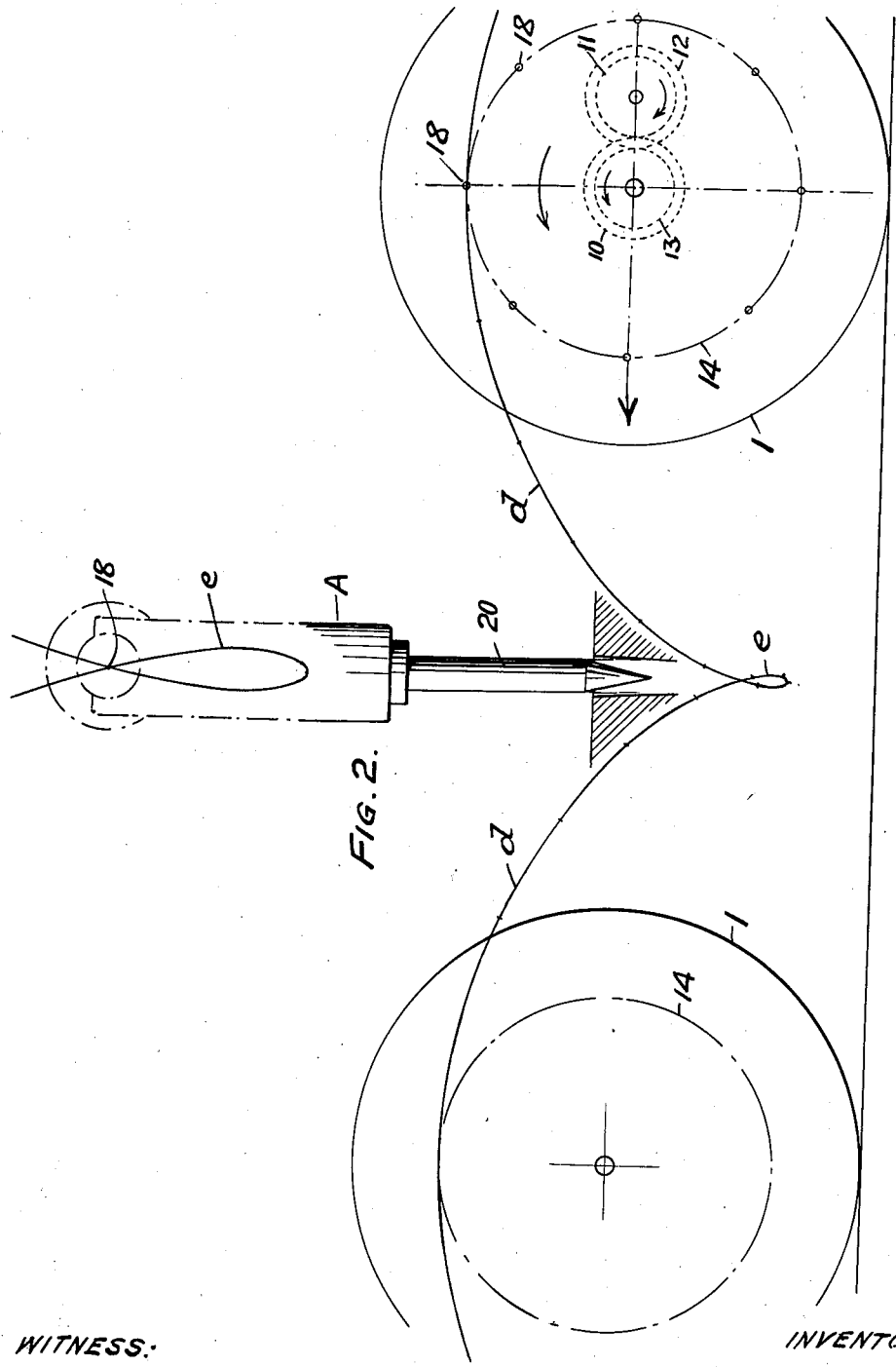
WITNESS:
INVENTOR
John T. Ramsden
Frank R. Wallace
BY
Augustus B. Stoughton
ATTORNEY.

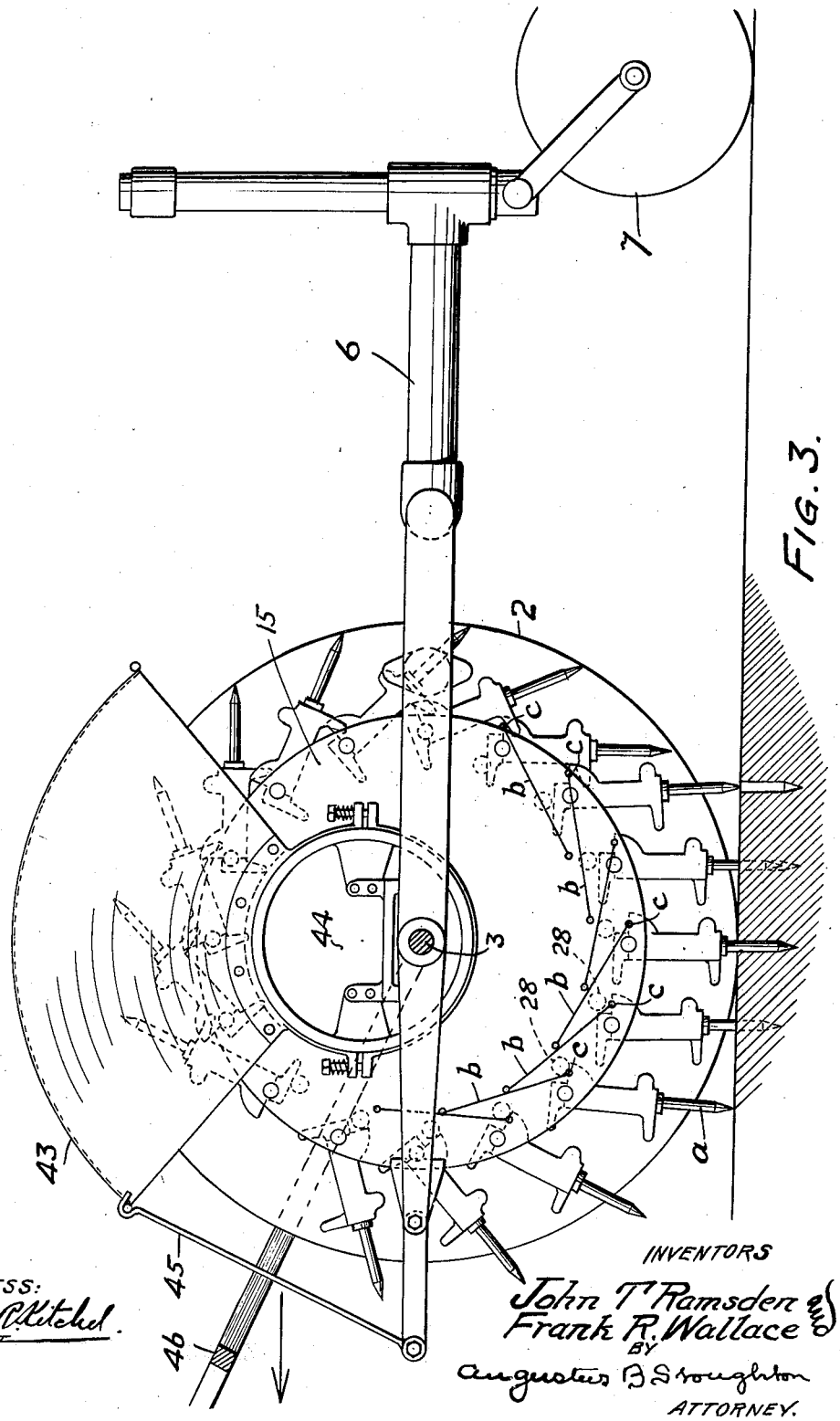

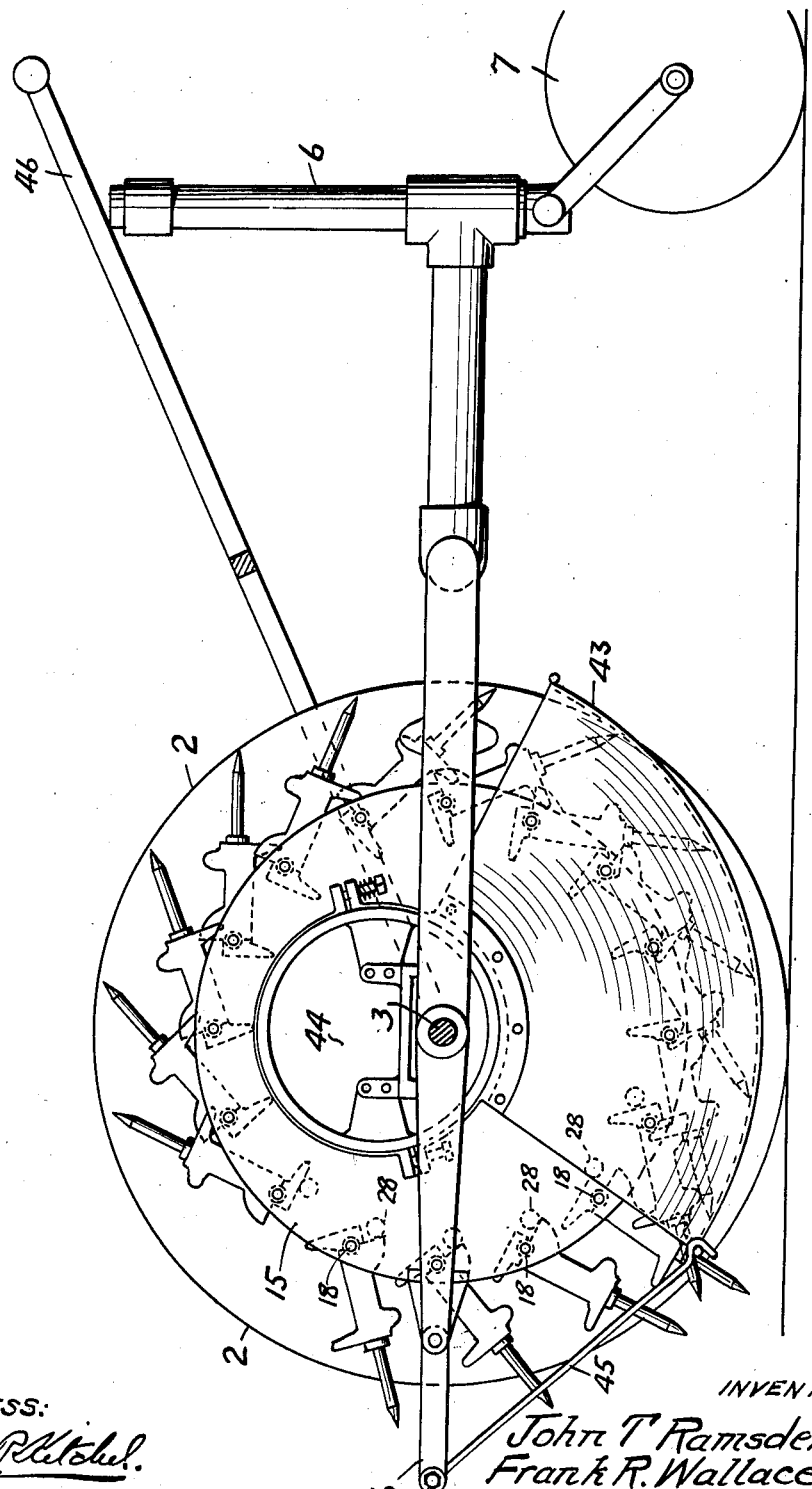

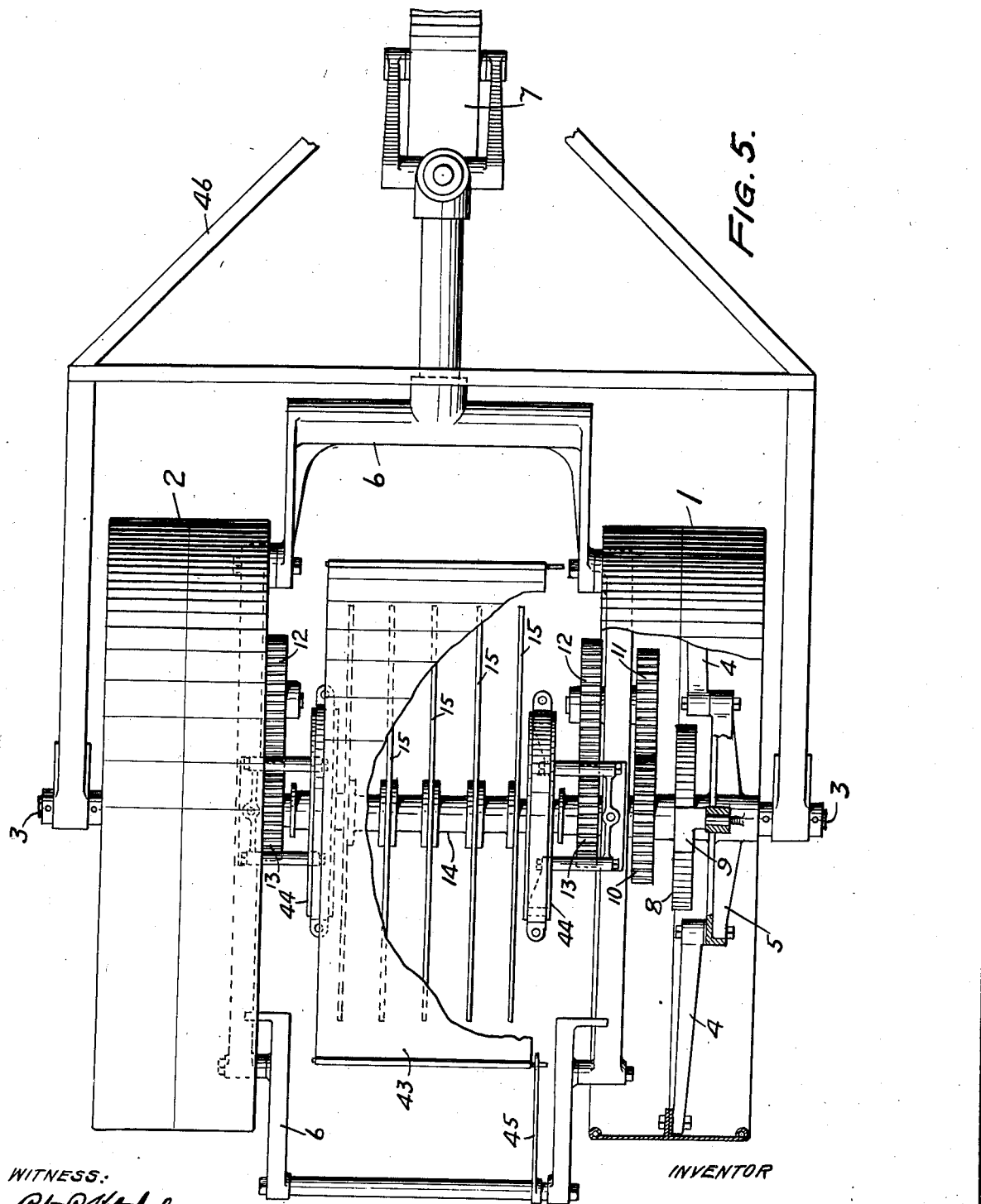

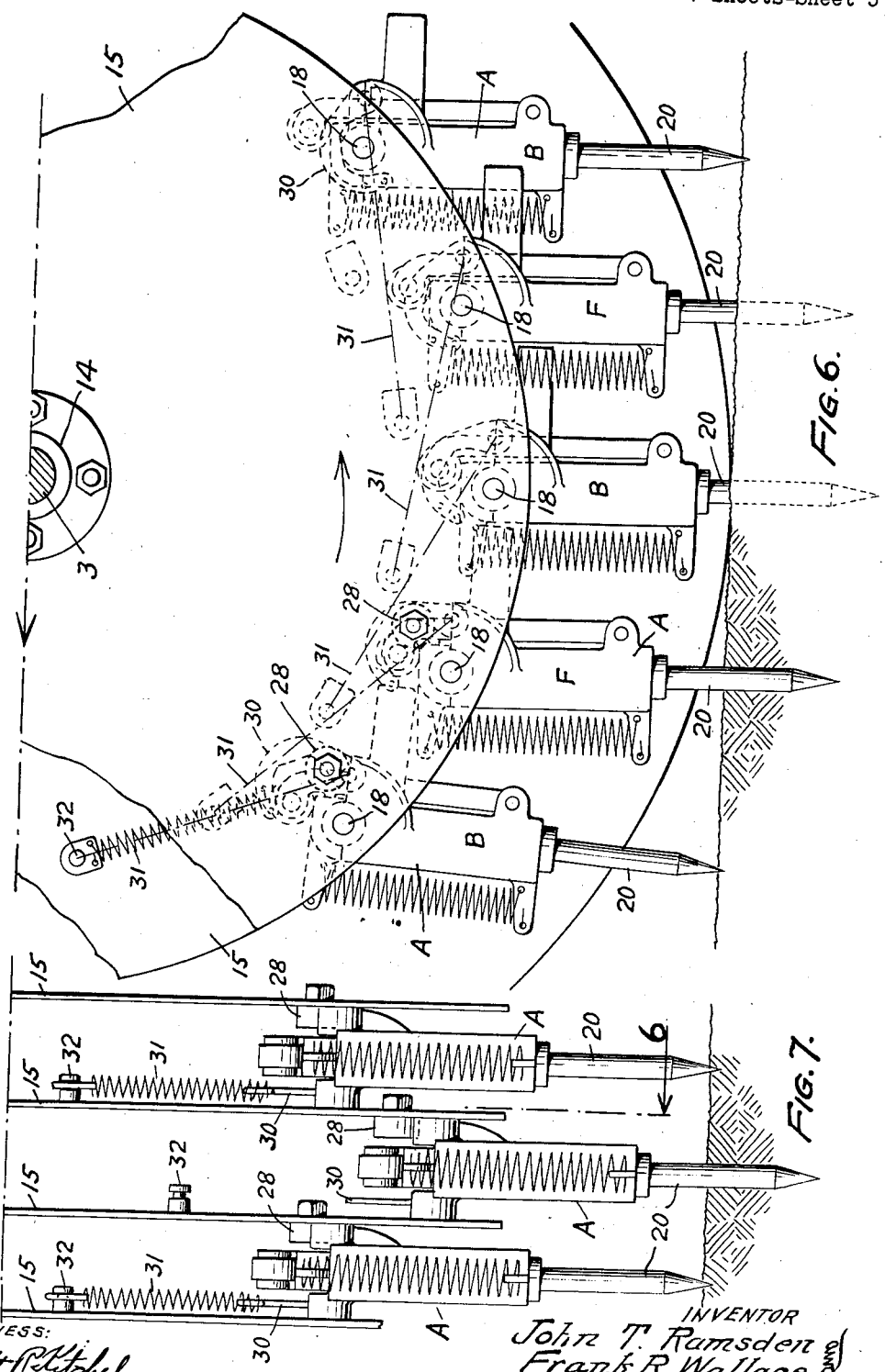

March 12, 1940.    J. T. RAMSDEN ET AL    2,193,779
LAWN PERFORATOR
Filed Dec. 7, 1937    7 Sheets-Sheet 6
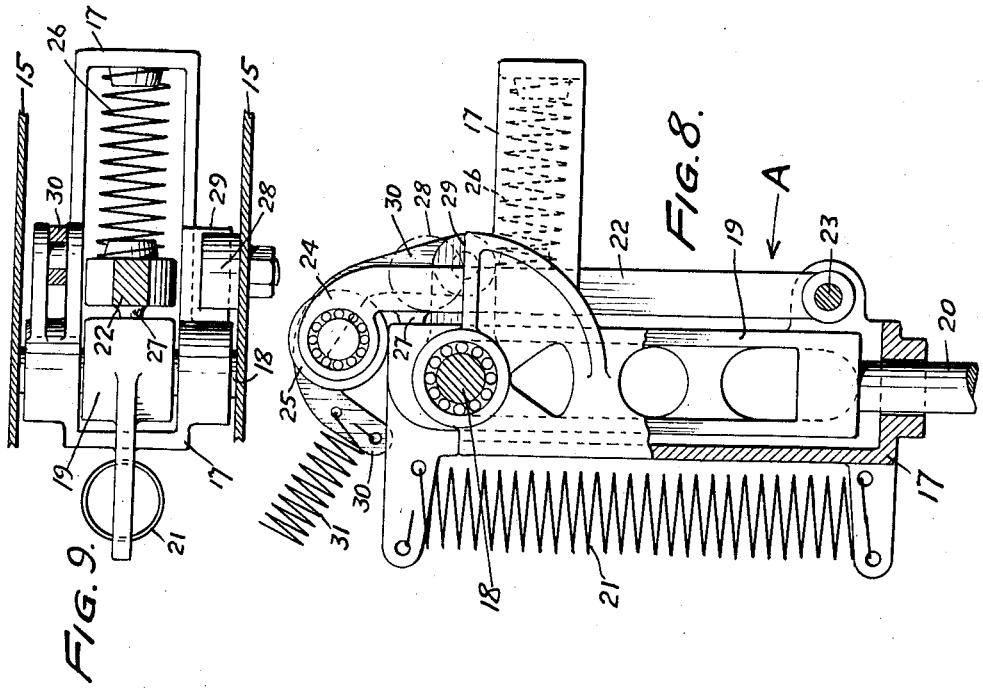
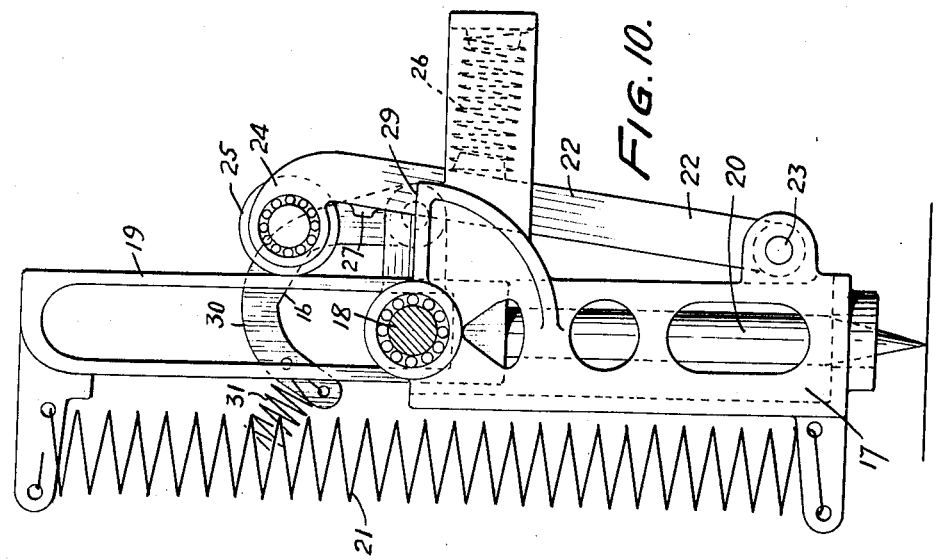
WITNESS:
Rob V. Mitchel
INVENTOR
John T. Ramsden
Frank R. Wallace
BY
Augustus B. Stoughton
ATTORNEY.

Patented Mar. 12, 1940

2,193,779

UNITED STATES PATENT OFFICE 2,193,779

LAWN PERFORATOR

John T. Ramsden and Frank Rich Wallace, Philadelphia, Pa., assignors to The Tabor Manufacturing Company, Philadelphia, Pa., a corporation of Pennsylvania Application December 7, 1937, Serial No. 178,472

5 Claims. (Cl. 97—52)

In the care of lawns, golf courses, putting greens and play and other fields, it is desirable in order to improve and keep the grass in good condition to introduce humus, fertilizers and moisture at and below the roots of the grass or sod. This requires that holes relatively near together be made in the ground by means of which the necessary substances may be introduced below the roots of the grass or sod.

Heretofore it has been proposed to make these holes by means of a roller provided with radial pins but the result was unsatisfactory because the pins tore up the sod or turf. The customary way to makes holes in the lawn or turf was to use a block provided with pins and having a handle. The operator stood on the board or block and wiggled it by means of the handle so that the pins made straight holes of proper conformation thru the turf or grass. This operation was necessarily slow and therefore expensive in regard to both time and labor.

The principal object of the present invention is to provide a machine which will rapidly and expeditiously make vertically directed straight holes in the lawn or other ground being treated and which therefore does not tear up the grass or sod. Another object of the invention is to provide such a machine that will not be unduly heavy and that can be used even on putting greens where the grass is quite short, because it places no more weight or load on the ground per unit of area than is placed by the weight of an ordinary man or person walking on the ground. Another object of the invention is to provide for pushing the pins into the ground and for withdrawing them from the ground with an endwise vertical movement whilst the machine is continually progressing forward over the ground. Another object of the invention is to provide for detaining the pins above the ground when it is necessary or desirable to turn the machine around.

Other objects of the invention will appear from the following description at the end of which the invention will be claimed.

It may be remarked that the machine travels or progresses along the ground and is carried by suitable wheels, or rollers, running on the ground and considering one pin pivotally connected with a rotating element the rotation of the latter will push the pin into the ground and withdraw it, but when the pin contacts with the ground the motion of translation of the machine tends to put the pin into inclined position, at first in the direction of movement of the machine and then in the opposite direction. If this were permitted to occur the pin would not enter and leave the ground in vertical direction and would not make clean holes but would leave the surface torn up and irregular.

Generally stated the invention comprises means for moving the pivot of the pin in the direction of forward travel of the machine to an extent substantially equal to the forward travel of the machine so that the pin after it touches the ground remains substantially vertical throughout the stroke which it is caused to make by reason of its pivotal connection with a rotating part. The invention also comprises means for turning the rotating element to which the pins are pivoted faster than the carrying roller or rolls of the machine and in the same direction.

The invention also comprises the improvements to be presently described and finally claimed.

In the following description reference will be made to the accompanying drawings forming part hereof and in which, Figure 1 is a diagrammatic or schematic view illustrating the path traveled by the pivotal points of pins located on a revolving disk driven faster than the ground roller which carries the machine and showing that these pivot points as they approach and leave the ground describe a loop so narrow that it may be regarded as a straight line.

Fig. 2 is a similar view showing the path described by the pivot point of a pin as it enters and leaves the ground on a larger scale than in Fig. 1.

Fig. 3 is a side view of a machine embodying features of the invention with the direction of action of certain parts indicated by straight lines, and with certain parts omitted for the sake of clearness.

Fig. 4 is a view similar to Fig. 3 and illustrating the machine with the pins held out of action and clear of the ground.

Fig. 5 is a top or plan view of the machine with parts broken away and with certain parts omitted for the sake of clearness.

Fig. 6 is a view drawn to an enlarged scale and illustrating portions of the machine and with parts omitted and other parts diagrammatically indicated. It is generally a section on the lines of Fig. 7.

Fig. 7 is an end view of Fig. 6 with parts omitted for the sake of clearness.

Fig. 8 is a view drawn to an enlarged scale and illustrating the holder for the pins.

Fig. 9 is a top or plan view of Fig. 8 with parts omitted.

Fig. 10 is a view similar to Fig. 8 but with the pins thrown out of action as by an obstruction at the ground.

Figure 12:
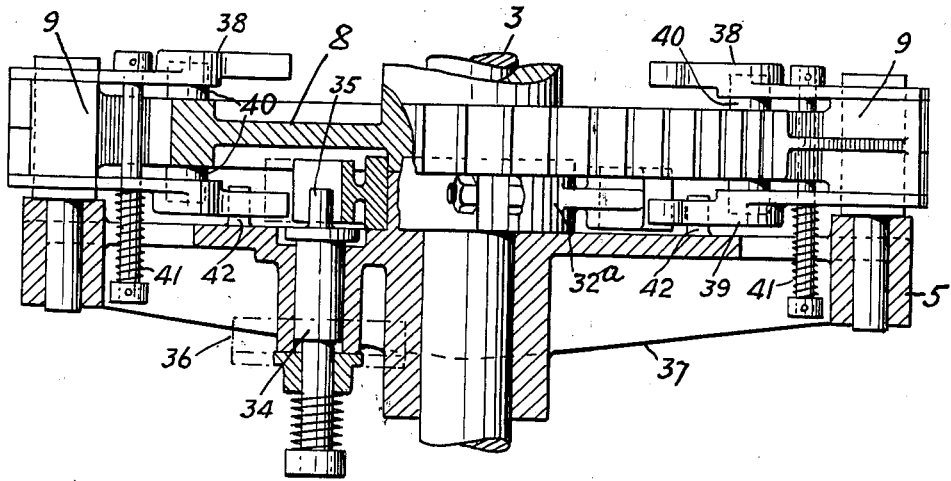
Fig. 12 is a transverse central section of Fig. 11.

In the drawings and referring to Fig. 5, 1 and 2 indicate ground rollers or wheels which carry the machine and enable it to progress over the ground. These parts 1 and 2 are alike and therefore a description of one of them will suffice. These parts 1 and 2 are mounted on an axle or shaft 3 as shown by means of spokes 4 radiating from a ring like hub structure 5 mounted on the shaft 3. A draft handle 46 is likewise connected to axle or shaft 3. The axle or shaft 3 also carries a frame 6 equipped with a caster wheel 7. 8 is a ratchet wheel freely revoluble on the shaft 3 and sometimes it is driven by means of pawls 9 carried by the hub structure 5, and it operates thru speed gearing 10, 11, 12 and 13 to drive a pin carrier 14. The pin carrier 14 is driven or rotated when the pawls are in action. The gears 10 and 13 revolve about the axle 3 and the gears 11 and 12 are revoluble about centers carried by the frame 6. The pin carrier 14 comprises, as shown, five disks 15. On these disks are pivotally mounted pin stock units A, Fig. 7. Referring to Figs. 8 to 10, the pin stocks comprise a rectangular frame 17, Fig. 9, pivoted by a pivot or pin 18 between the disks 15. In these frames 17 are arranged slides 19 provided with oblong openings which straddle the pivots 18. The slides 19 have attached to them the pins 20. Springs 21 interposed between the slides and the frame 17 bias the pins 20 downward toward the ground. To hold the pins in normal position as shown in Fig. 8 and yet to permit them to occupy the position shown in Fig. 10, there is provided a locking or escapement arm 22 pivoted to the frame 17 at 23 and equipped with an offset end 24 carrying a roller 25. A spring 26 normally positions the arm 22 as shown in Fig. 8 with the roller 25 on top of the slide 19, but quite near its edge as shown in Fig. 8 so that if the pin 20 strikes an obstruction on the ground the roller 25 clears the top of the slide as shown in Fig. 10. It may be remarked that the arm 22 is provided with a stop 27 which serves to properly position the roller 25 in respect to the top of the slide. On the disks 15 are stops 28 and the frames 17 have at one side thereof cheeks 29 which cooperate with these stops for the purpose of positioning the pins 20 vertically as they strike the ground. The other side of the frame 17 is provided with a link 30 shown in Figs. 8 and 10 but partially omitted from Fig. 9. This link 30 is curved and at its free end is attached a spring 31; the other end of the spring 31 is connected to a disk 15 as indicated at 32 in Figs. 6 and 7. It may be remarked that the purpose of this is to cause the spring 31 to turn the cheek against the stop 28 when the line of draft of the spring 21 is above the center of the pivot 18, and when the line of draft is below the center of the pivot 18 the stock is drawn in the opposite direction by the influence of the spring 31. The link 30 is provided with a flat 16 (shown in Fig. 10) which contacts with the top of the frame 17, as shown particularly at the right in Fig. 6, and this limits the line of draft of the spring 31 when the line of draft is below the center of pilot 18. The purpose of this will be hereinafter described.

Figure 11:
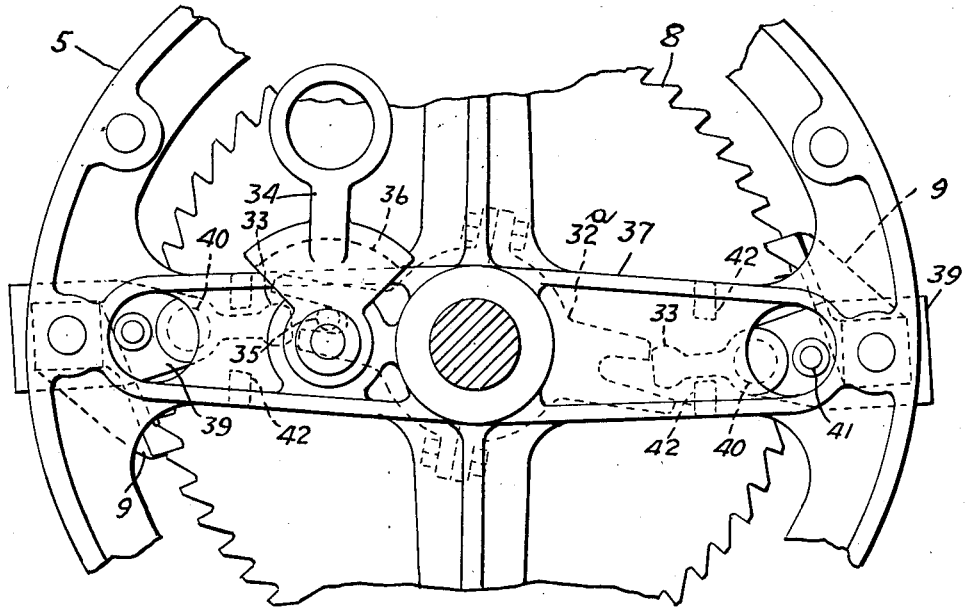
Fig. 11 is a partial side view of means by which the pin carrier is driven from the roller.

Referring to Figs. 11 and 12, the pawls 9 which are carried by the hub 5 of the roller 1 are put into and out of operation by a turnable member 32a pivotally mounted on hub structure and equipped with fingers that operate on the tails 33 of the pawls. The member 32a is turned to throw the pawls into and out of action by a spring pressed hand piece 34 mounted for reciprocating movement in hub structure 5 and having an eccentric pin 35, Fig. 12, which operates in a notch in the member 32a. The hand piece 34 is equipped with a lip 36 which can be positioned on one side or the other of a rib 37 so as to prevent accidental turning of the hand piece 34, and so as to permit it to be pulled out and turned to place with the lip on one side or the other of the rib and thus to position the pawl in operative and inoperative positions. In order that the pawls may not chatter, their tails are divided as shown at 38 and 39 in Fig. 12 and blocks of wood or the like 40 are interposed between these divisions and the ratchet wheel 8. A spring 41 serves to keep these blocks of wood up against the ratchet wheel because it presses the parts 38 and 39 toward each other. It may be remarked that 42, Fig. 11, are stops that limit the movement of the tails of the pawls. 43 is a hood or collector in the form of a part of a sector of a circle, Figs. 3 and 5, and it is turnable about eccentrics 44 carried from the sides of the frame 6, Fig. 5, next to the outside disks of the pin carrier. Normally it is held in the position shown in Fig. 3 by a hook 45, Fig. 3, but when the machine is to be turned around the hood occupies the position shown in Fig. 4, and in that position it keeps the pins 20 from entering and from contact with the ground.

The mode of operation of the described machine may be explained as follows in connection with Fig. 3. Referring to the pin indicated at a, it is in contact with the ground and it is in substantially vertical position because the line of draft b of its spring 31 is such that it is held up as at c against its stop 28. The machine is moving toward the left and the roller 1 and pin carrier 14 are turning counter-clockwise. The pin carrier is turning at a higher speed of revolution than the roller 1. The result of this is as follows: when the pin a strikes the ground its pivot 18 tends to move toward the left as the machine as a whole travels in that direction, but the revolution of the pin carrier counter-clockwise and at a higher speed than the revolution of the roller moves the pivot toward the right so that the pin remains vertical as it enters and leaves the ground as will be readily understood by reference to Fig. 3. Since the pin is held by the ground and the pin carrier which carries the stop 28 moves in a circle the stop 28 moves away from the cheek 29, and thus the line of draft b of the spring 31 is changed until finally the line of draft passes below the pivot point 18 and thus the spring 31 becomes ineffective to turn the cheek towards the stop, but becomes effective to turn the pins in the opposite direction and into the position shown at the right in Figs. 3 and 5, and this position they occupy during the rotation of the pin carrier until they pass over the center line at the top when they fall into the position indicated at 75 the left which brings the line of draft of the springs 31 into position to turn the pins against their stops.

Referring to Fig. 1, the path of the successive pivot points 18 of the pins is indicated at $d$ and the form of this path is due to the travel of the machine toward the left and to the turning motion of the pin carrier 14 at a greater speed of revolution than the roller 1. This path of travel includes a narrow loop $e$ shown on a larger scale in Fig. 2 and this narrow loop $e$ is substantially equivalent to a straight vertical line and so it is that the pins enter and leave the ground in a vertical line, in that way the ground is not torn up and the holes are straight and are of substantially circular cross section throughout their length.

The machine described is intended to be propelled by hand but it is quite evident that it can be propelled by any traction device, or it may be driven from a suitable source of power carried upon it. The point is that the pin carrier shall be run at a faster speed of revolution than the carrying wheel or roller 1. When it is desired to put the pins out of action to turn the machine, or for any other purpose, the hand-piece 34 is reversed which makes the pawls 9 ineffective for turning the pin carrier and the hood 43 is turned into the position shown in Fig. 4 and secured in that position by the hook 45. In that position all the pins 20 are held clear of the ground and at rest so that the machine may be turned in any direction or moved about without functioning.

It may be remarked that there are a series of pins 20 between the disks 15 and that the pins in the respective series are staggered. The purpose of this is to enable the pins to clear each other and in Fig. 6 the pins that lie in one plane are marked F, and the pins which lie in the plane parallel to but back of the first mentioned plane are marked B.

It will be obvious to those skilled in the art to which the invention relates that modifications may be made in details of construction and arrangement and in matters of mere form without departing from the spirit of the invention which is not limited in respect to such matters, or otherwise than the prior art and the appended claims may require.

We claim:

1. A machine for making straight holes in a lawn or other ground which comprises the combination of carrying wheels on which the machine is mounted for motion of translation, pins pivotally carried by the machine and adapted to enter and to leave the ground, means for reciprocating the pins endwise, mechanism for moving the pivots of the pins opposite to the direction of travel of the machine for substantially the distance of travel of the machine during the time required for the pins to enter and to leave the ground, and means for yieldingly holding said pins in substantially vertical position during the time required for the pins to enter and to leave the ground, whereby the pins punch substantially straight holes in the ground.

2. In a machine of the type recited, a rotating pin carrier, pins, pin stocks pivoted to the pin carrier, means for positioning the pin stocks in respect to the carrier to present the pins normal to the surface of the ground, slides movable in the stocks and to which the pins are connected, springs pressing said slides to pin driving position, and an escapement mechanism normally holding the slides radially in pin driving position and adapted to release the slides when the movement of the pins is obstructed.

3. In a machine of the type recited, a rotatable pin carrier, pins pivotally mounted thereon, stops on the pin carrier for positioning the pins in pin driving position, springs interposed between the carrier and pins and effective on one side of the pivots to position the pins in operative relation to the stops and on the other side of the pivots to permit the stops to advance away from the pins when in the ground and to turn by gravity in the rotation of the carrier back to their original positions.

4. In a machine of the type recited the combination of a rotatable pin carrier, pins pivoted thereto, means for putting the pins into driving position, and a hood mounted eccentrically in respect to the axis of the pin carrier and adapted in one position to support the pins clear of said means and of the ground when the carrier is out of action to facilitate movement of the machine with the pins clear of the ground.

5. The combination substantially as described in claim 3, in which the pins are carried in pivotally mounted pin stocks and in which curved links connect the ends of the springs to the stocks and by abutting on the stocks limit the change of direction of the line of draft of the springs in respect to the pivots of the stocks.

JOHN T. RAMSDEN.
FRANK RICH WALLACE.